March 27, 1951 A. F. SCHWENDNER ET AL 2,546,410
POWER PLANT SYSTEM
Filed Jan. 29, 1945 4 Sheets-Sheet 1

INVENTORS
ANTHONY F. SCHWENDNER,
OZRO N. BRYANT.
BY
ATTORNEY

March 27, 1951

A. F. SCHWENDNER ET AL 2,546,410

POWER PLANT SYSTEM

Filed Jan. 29, 1945

INVENTOR
ANTHONY F. SCHWENDNER,
OZRO N. BRYANT.
BY
ATTORNEY

INVENTORS
ANTHONY F. SCHWENDNER,
OZRO N. BRYANT.
BY
*a. B. Ruvie*
ATTORNEY

Patented Mar. 27, 1951

2,546,410

UNITED STATES PATENT OFFICE 2,546,410

POWER PLANT SYSTEM

Anthony F. Schwendner, Ridley Park, and Ozro N. Bryant, Prospect Park, Pa., assignors to Westinghouse Electric Corporation, East Pittsburgh, Pa., a corporation of Pennsylvania Application January 29, 1945, Serial No. 575,127

17 Claims. (Cl. 290—4)

The invention relates to a power plant including a plurality of main turbo-generators supplying power to buses of different frequencies and a spare turbo-generator normally connected to one of the buses to supply a small part of the power required thereby and it has for an object, in the event of failure of a main turbo-generator of frequency different from that of the bus to which the spare turbo-generator is connected, to effect automatically change in frequency of the spare turbo-generator suitably for connection to the bus of the failing turbo-generator, to disconnect the spare turbo-generator from said one bus, and then to connect it to the bus of the failing turbo-generator followed by manually operated or controlled adjustment of the spare turbo-generator, if required, to carry the load of the bus to which it is connected at the frequency of the failing turbo-generator.

A further object of the invention is to provide, for the spare turbo-generator, of the arrangement above described wherein the spare turbo-generator is normally connected to the bus of a main turbo-generator of lowest frequency, a governor and a system for connecting the spare turbo-generator to any of the buses such that it is normally connected to the bus of lowest frequency to carry a suitably small fraction of the load of the latter, but, in the event of failure of any of said main turbo-generators, is operative to take the place of such failing turbo-generator, the governor being adjusted so that the spare turbo-generator carries the load of the bus of lowest frequency when its turbo-generator fails and the system being automatically operative, when any of the turbo-generators of higher frequency fails, to adjust the governor for operation of the spare turbo-generator to carry the normal load of the bus of the failing turbo-generator at the normal frequency of the latter, to disconnect the spare turbo-generator from the bus of lowest frequency, and then to connect the load and frequency adjusted spare turbo-generator to the bus of such failing turbo-generator of higher frequency, after which, if the actual load of the bus should deviate from the normal load, further adjustment is made manually to carry the bus load at the desired frequency.

A further object of the invention is to provide a system of the above character with interlocks such that, if the spare turbo-generator is substituting for any of the main turbo-generators, the system is ineffective to connect the spare turbo-generator in substituting relation for another failing turbo-generator, that is, to provide a system whose substituting operation requires, for initiation, that failure shall occur from the condition of all the main turbo-generators supplying their buses and the spare turbo-generator connected to supply a small portion of the load of one of the buses, and preferably the bus of lowest frequency, because the continuously running spare turbo-generator accelerating, on account of the automatic and selective pre-setting operation, meets the decelerating load of the bus whose generator has failed and carries the load back to normal frequency, this being a stable arrangement and one requiring the least time for substitution.

In certain industrial processes, the need arises for electrical power at different frequencies and supplied continuously or with interruptions of such small duration as not to interfere with substantial continuity of the process. For example, the process may involve flow of material through different stages, treatment steps, or operations of a plant with the material undergoing physical or chemical changes in timed relation to the stages, steps or operations and interruption of substantial continuity of flow may be attended with serious results. If a change in state, such as from a fluent to a nonfluent condition, should occur at the wrong place, the plant may have to be shut down and the equipment reconditioned, repaired or replaced before it is again suitable for carrying on the process. Frequently, interruptions of short duration are not attended with serious consequences. Therefore, in accordance with the present invention, with a plant of this general character whose energy and power requirements are satisfied by a plurality of main turbo-generators operating at different frequencies, there is provided a spare turbo-generator normally connected to the bus of one of the main turbo-generators to supply a small part of the load with means providing for automatic adjustment of the spare turbo-generator for the normal load and frequency of the bus of a failing one of the other of the main turbo-generators and for its connection in place thereof, together with manually operable or controllable means for adjusting the spare turbo-generator to correct for deviation of bus load from normal. As substitution of the spare turbo-generator for a failing main turbo-generator of frequency different from that of the bus to which the spare turbo-generator is normally connected involves automatic frequency adjustment thereof, disconnection thereof from the bus to which it is normally connected, and connection thereof to the bus of the failing turbo-generator, provision should be made, by interlocking, to avoid automatic response except from the condition where the buses are connected to the main turbo-generators and the spare turbo-generator is connected to one of the buses and supplies a minor part of the load thereof.

A further object of the invention is to provide apparatus of the above character with a spare turbo-generator governor of the force-amplifying type with the result that small changes in spring force, requisite to operate the spare turbo-generator at any of the different frequencies and to vary the load carried at any frequency, may be effected by automatic output movements of a mechanism having set into it movement magnitudes required for adjustment of the spare turbo-generator to suit normal load and frequency conditions of buses of main turbo-generators of different frequencies together with manually controllable means for adjusting the automatic output movement after connection of the spare turbo-generator to a bus to compensate for deviation in actual load of the latter from normal.

The foregoing and other objects are effected by the invention as will be apparent from the following description and claims taken in connection with the accompanying drawings, forming a part of this application, in which:

Figure 1:
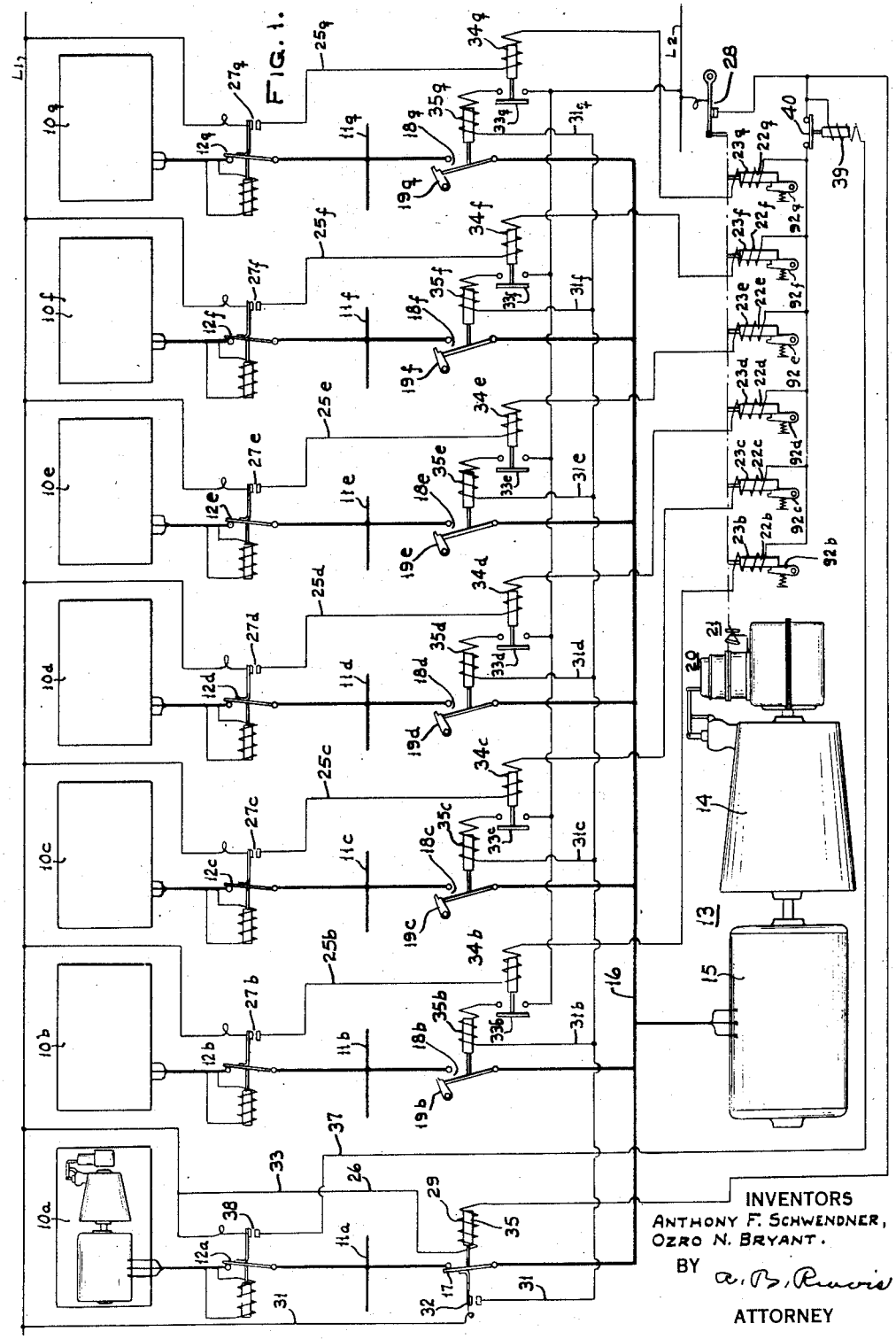
Fig. 1 is a diagrammatic view of the plant showing main turbo-generators and the spare turbo-generator together with the controlling connections.

Referring to Fig. 1, there are shown, by way of example, a plurality of main turbo-generators $10a$, $10b$, $10c$, $10d$, $10e$, $10f$ and $10g$ of increasing frequencies, the turbo-generator, at $10a$, having the least frequency, the turbo-generator, at $10b$, having the next higher frequency, and so on, the turbo-generator, at $10g$, having the highest frequency. The turbo-generators, at $10a$, $10b$, $10c$, $10d$, $10e$, $10f$ and $10g$ are respectively connected to the buses $11a$, $11b$, $11c$, $11d$, $11e$, $11f$ and $11g$ by means including the circuit breakers $12a$, $12b$, $12c$, $12d$, $12e$, $12f$ and $12g$, respectively. A spare turbo-generator is shown, at $13$, it comprising the elastic fluid turbine $14$ driving a generator $15$ which is connected to the bus $16$. A normally-closed switch or circuit breaker $17$ normally connects the bus $16$ of the spare turbo-generator, at $13$, to one of the buses, for example, the bus $11a$ of the lowest frequency. Normally-open switches are shown at $18b$, $18c$, $18d$, $18e$, $18f$ and $18g$ for connecting the bus $16$ to the second turbo-generator buses $11b$, $11c$, $11d$, $11e$, $11f$ and $11g$, respectively. Because of the manner in which connections hereinafter described are made, the main turbo-generator $10a$, or the one whose bus is connected to the spare turbo-generator, is referred to as a "first turbo-generator" and the main turbo-generators $10b$, $10c$, $10d$, $10e$, $10f$ and $10g$, or the main turbo-generators other than said one main turbo-generator, as "second turbo-generators."

The admission of motive fluid to the turbine $14$ of the spare turbo-generator is controlled by means of a governor, at $20$, provided with speed and load adjusting apparatus, at $21$, normally set to govern the turbine at a speed corresponding to the frequency of the first main turbo-generator, at $10a$, of lowest frequency and carrying a minor portion, for example, 10 per cent, of the load of the bus $10a$. Thus, when the spare is functioning as a standby and running at a speed corresponding to the lowest frequency, it may accelerate to meet a decelerating load to restore the latter to normal frequency in a suitably short interval of time. If the main turbo-generator of lowest frequency should fail, then as the spare turbo-generator is already connected to the bus $11a$, it may be adjusted manually to carry the load of the bus by operation of the apparatus, at $21$.

The invention comprises the arrangement of turbo-generators above described wherein the spare turbo-generator is arranged to take the place of any failing main turbo-generator, the spare turbo-generator being normally connected to the bus of one of the main turbo-generators and carying a minor part of the load thereof, together with a controlling system for disconnecting a failing main turbo-generator, for automatically adjusting the governor of the spare turbo-generator suitably for the frequency of the bus of the failing main turbo-generator, for then connecting the spare turbo-generator to the bus of the failing main turbo-generator, and for manually adjusting the governor of the spare turbo-generator to compensate for load and frequency deviations from normal of the bus of the failing main turbo-generator. The controlling system includes the governor speed and load adjusting apparatus, at $21$, with the means to be described for adjusting the latter.

To facilitate an understanding of the controlling system, certain underlying principles should be borne in mind. The ordinary governor for a turbine is equipped with a speed changer which operates to change the load spring force. The effect of speed changer adjustment in a speed-increasing direction is to increase the motive fluid admission to increase the torque of the motive fluid acting on the turbine rotor. With no change in load, increase in such torque results in increase in speed, and, if there is a change in load, there must be a corresponding change in torque to avoid speed change. Therefore, in accordance with the present invention, with the spare turbo-generator connected to the bus of one of the main turbo-generators, there is provided speed-changing apparatus for adjusting the governor spring means and the apparatus is capable of being pre-set for the normal loads and frequencies of the other main turbo-generators so that, in the event of failure of any of said other turbo-generators the apparatus is selectively operative automatically to effect speed-changing adjustment of the spare turbo-generator suitably to the normal load and frequency conditions of the bus of the failing turbo-generator, to disconnect the speed-adjusted spare turbo-generator from the bus of said one turbo-generator, and to connect it to the bus of the failing one of said other turbo-generators. The apparatus also includes manually controlled or operated means to care for deviations in load so that the desired frequencies may be preserved and to make it possible for the spare turbo-generator to remove full load or take on full load at any frequency. Assuming, for example, that the spare turbo-generator has been automatically substituted for a failing turbo-generator and that it is desired to restore the latter to its bus, then, after synchronizing such main turbo-generator and connecting it to its bus, the bus load is gradually transferred from the spare turbo-generator to the re-connected main turbo-generator until the latter carries the entire bus load, whereupon the spare is disconnected; and, then, after synchronizing the spare turbo-generator with the main turbo-generator supplying the bus to which it is normally connected, it is connected to the latter bus, whereupon load is transferred from the main turbo-generator to the spare turbo-generator to a desired extent to maintain the latter running at the frequency of the main turbo-generator with the result that the time required for frequency change and connection transfer of the spare turbo-generator is minimized.

The controlling system includes the governor adjusting apparatus, at 21, operative electrically and manually for adjusting the governor of the spare turbo-generator for frequency and load changes. Referring to the automatic frequency changing adjustment incident to transfer of the spare turbo-generator from the bus of one frequency to the bus of a failing main turbo-generator of different frequency, if, as shown, the spare turbo-generator is connected to the bus of a first main turbo-generator, at 10a, of lowest frequency, first controlling circuits 25b, 25c, 25d, 25e, 25f and 25g are associated with second main turbo-generators, at 10b, 10c, 10d, 10e, 10f and 10g, of higher frequency; and, in the event of failure of any of the second main turbo-generators, the corresponding circuit is closed to effect automatic operation of the apparatus, at 21, to adjust the governor for normal frequency and load conditions of the failing main turbo-generator. A second normally-closed controlling circuit 26 is effective to energize means to close the circuit breaker or switch 17 between the spare turbo-generator and the first main turbo-generator bus 11a, and the second controlling circuit is opened pursuant to a frequency changing operation effected by one of the first controlling circuits to open the switch or circuit breaker 17 and render effective means for connecting the spare turbo-generator to the bus of the failing one of the second main turbo-generators of higher frequency. Manually operable or controllable means provides for adjustment of the apparatus, at 21, to correct the automatic adjustment to correct for deviation in load and frequency of the bus of the replaced main turbo-generator so that the spare turbo-generator may operate at the normal frequency of the bus to which it is connected and carrying the load of the latter.

The first controlling circuits 25b, 25c, 25d, 25e, 25f and 25g extend between the lines L₁ and L₂ and are associated with the main turbo-generators 10b, 10c, 10d, 10e, 10f and 10g. The circuits include normally-open contacts 27b, 27c, 27d, 27e, 27f and 27g which are closed by opening of the circuit breakers 12b, 12c, 12d, 12e, 12f and 12g and they also include the windings 23b, 23c, 23d, 23e, 23f and 23g effective, when energized, to move the cores 22b, 22c, 22d, 22e, 22f and 22g of actuating members to actuated position. Such windings, cores and actuating members are parts of the governor adjusting apparatus, at 21.

The second controlling circuit 26 extending between the lines L₁ and L₂ is normally closed to close the circuit breaker or switch 17 between the spare turbo-generator and the bus 11a of lowest frequency.

The first and second controlling circuits include a common switch 28 which is opened in response to movement of any of the cores 22b, 22c, 22d, 22e, 22f and 22g to actuated position, whereupon the winding 29 is deenergized and the switch or circuit breaker 17, normally maintained magnetically closed by the latter winding, opens to disconnect the spare turbo-generator from the bus 11a and then to render means effective to connect the speed-adjusted spare turbo-generator to the bus 11b, 11c, 11d, 11e, 11f or 11g of the failing main turbo-generator.

The connecting operation may be effected in any suitable manner; for example, there is shown circuit means 31 between the lines L₁ and L₂ and including normally-open contacts 32 which are closed by opening of the circuit breaker or switch 17 and parallel branch circuits 31b, 31c, 31d, 31e, 31f and 31g having switches 33b, 33c, 33d, 33e, 33f and 33g which are closed magnetically by windings 34b, 34c, 34d, 34e, 34f and 34g included in the first circuits 25b, 25c, 25d, 25e, 25f and 25g. Therefore, when any of the first controlling circuits is closed, the switch of the corresponding branch circuit 31b, 31c, 31d, 31e, 31f and 31g is closed, thereby conditioning the circuit means 31 for closure upon opening of the circuit breaker or switch 17; and, upon closure of the circuit means, the winding 35b, 35c, 35d, 35e, 35f or 35g of the closed branch 31b, 31c, 31d, 31e, 31f or 31g is energized to close the corresponding switch 18b, 18c, 18d, 18e, 18f or 18g to connect the spare turbo-generator to the bus 11b, 11c, 11d, 11e, 11f or 11g of the failing one of the second main turbo-generators of higher frequency, the switches being shown as provided with latches 19b, 19c, 19d, 19e, 19f and 19g for holding them closed.

A controlling circuit 37 extends between the lines L₁ and L₂ and it includes contacts 38 which are closed by opening of the circuit breaker 12a of the main turbo-generator of lowest frequency to energize the winding 39 to open magnetically the normally-closed switch 40 which is common to the first controlling circuits 25b, 25c, 25d, 25e, 25f and 25g.

Not only does the switch 28 assure of automatic speed or frequency changing operation initiated by closing of one of the first controlling circuits 25b, 25c, 25d, 25e, 25f and 25g before the spare turbo-generator is disconnected from the lowest frequency bus 11a, but it serves in an interlocking capacity to prevent actuation of a second core if the spare turbo-generator is connected in place of a failing main turbo-generator 10b, 10c, 10d, 10e, 10f or 10g of higher frequency. Also, the switch 40 common to the first controlling circuits 25b, 25c, 25d, 25e, 25f and 25g functions in an interlocking capacity to prevent automatic speed-changing operation in response to failure of one of the second main turbo-generators of higher frequency if the spare turbo-generator has replaced, by appropriate manual adjustment of the apparatus, at 21, the first main turbo-generator 10a of lowest frequency in carrying the load of the bus 11a.

Assuming that the spare turbo-generator is connected to a bus in place of a failing turbo-generator, then, as already pointed out, it is necessary to effect a speed and load adjusting operation of the governor adjusting apparatus, at 21, so that the spare turbo-generator may carry the load of the bus at the normal frequency. This effect is accomplished by manually operable or controllable means such as the hand wheel 42 or the motor 43. Further, such manual means provides for adjustment of the spare turbo-generator to take on the entire load of the bus 11a when the first main turbo-generator fails.

To simplify the governor adjusting apparatus, at 21, differing motion magnitudes of the latter should result in proportional turbine valve movements. Mechanical simplification and increased accuracy are provided by having a governor whose spring force is proportionally changed by the input movements and such spring force changes are amplified and used to control a force-responsive servo-motor for operating the governor valve. The required proportional force operation is provided, for example, by the pressure transformer governor, at 20, of conventional type and shown in Fig. 2. The governor includes a transformed pressure space 46 supplied with liquid through orifice means 47 from a turbine driven impeller 48. Liquid pressure in the space 46 acts on the piston 49 of a relay and is controlled by the cup valve 50 having an area exposed to pressure in the space so that the force of space pressure tends to move it in an opening direction to reduce the pressure. Force opposing the opening pressure is applied to the cup valve by a thrust-transmitting member 51 engaging the abutment 52 of bellows structure closing the pressure space 53. Force varying substantially as the square of the turbine speed and applied to the cup valve is provided, for example, by liquid under pressure varying substantially as the square of the turbine speed and furnished from the turbine driven impeller 54 to the space 53 for action on the area of the abutment 52. The force of such pressure on the abutment 52 is in opposed relation to the tension force exerted thereon by the spring 55, whose lower end is connected to the bell crank 56 movable about the pivot 57 and engaged by the pusher 58 operated by the governor adjusting mechanism, at 21.

The force of pressure in the space 46 and acting on the relay piston 49 is opposed by the force of the spring 59 acting on the latter. The force of liquid pressure acting on the relay is larger than that acting on the cup valve 50 to the extent of the ratio of annulus pressure area of the piston to the cup valve area. The amplified force is applied to the relay cup valve 60 covering the exhaust bore 61 formed in the piston valve 62, which controls the admission and exhaust of motive liquid to the operating cylinder 63 at opposite sides of the operating piston 64 mechanically connected to the admission valve 65 of the turbine 14. The annulus area 66 of the upper end of the pilot valve 62 about the relay cup valve 60 is exposed to pressure existing in the space 67 supplied with liquid through the orifice 68 from the turbine driven impeller 48, and the downwardly-acting force due to such pressure and applied to the area 66 of the pilot valve is opposed by the upwardly-acting force of the spring 69 exerted on the lower end of the latter.

Assuming an increase of turbine load, the decrease in speed causes the pressure to decrease in the space 53, whereupon the cup valve 50 opens slightly to reduce the liquid pressure in the space 46, in consequence of which the resultant of the compressive force of the spring 59 and of the liquid pressure force acting on the piston 49 is reduced and the cup valve 60 moves upwardly, reducing the pressure in the space 67, thereby rendering the spring 69 effective to cause the pilot valve 62 to follow the cup valve upwardly to connect the cylinder space above the operating piston with the motive fluid pressure supply and the space below the piston to the exhaust. The operating piston then moves downwardly to open wider the admission valve 65; and, as the operating piston moves downwardly, the follow-up lever 70 is operated to increase the compressive force of the spring 59 and tending to move the cup valve 60 downwardly, restricting the escape of liquid from the space 67 and through the bore 61 to the exhaust. The increasing pressure thereby brought about in the space 67 acts on the area 66 to move the piston valve downwardly, whereby downward motion of the cup valve is followed by downward motion of the piston valve until the latter is restored to neutral or cut-off position with the upwardly and downwardly-acting forces thereon in equilibrium. The reverse operation occurs with a decrease in load.

The equilibrium of forces acting on the cup valve 50 is changed by changing the tension force of the load spring 55 by adjustment of the governor adjusting apparatus, at 21. An increase in tension force of such spring is accompanied by a decrease in pressure in the space 46 and operation of the servo mechanism to increase the admission of motive fluid to increase the speed of the turbine, if the load remains the same, or to increase the load of the turbine, if the speed remains the same. With a decrease in spring force, the consequent increase in pressure in the space 46 dependent upon such decrease in spring force is effective to bring about reduction in speed of the turbine at the same load or reduction in load at the same speed. As a change in force of the spring 55 brought about by adjustment of the governor adjusting mechanism, at 21, is accompanied by an amplified change in force applied to the cup valve 60, it will be apparent that the governor operates in a proportional force manner, that is, changes in force applied to the cup valve and due to speed change or change in spring force are accompanied by proportionate but amplified changes in force used to actuate the pilot valve of the servo mechanism, with the result that the turbine admission valve is moved in accordance with amplified force changes. Because of proportional force operation, it is possible to use a spring 55 providing adequate scale for the required spring force change with a spring of reasonable length and requiring only a limited or reasonable extent of governor speed adjusting movement. It is, therefore, possible to provide an apparatus, at 21, with motion magnitudes which may differ by small amounts and which are pre-set or adjusted for normal load and frequency conditions of the main turbo-generators. The apparatus is mechanically simple because small motion magnitudes and differences thereof may be used with accurate results, this being due to the fact that each increment of adjusting motion finds its counterpart in a proportional spring force increment, which is magnified in a proportional manner and the magnified force is applied to a force-responsive servo-motor to effect proportional movement of the governor valve. Thus it is feasible to use a small range of spring force change to provide a large but proportional range of amplified force change. Therefore, a governor of the force transformation type functions uniquely on this account in cooperation with the controlling system used with the governor speed-changing apparatus to effect the operations of the spare turbo-generator herein described.

Figure 5:
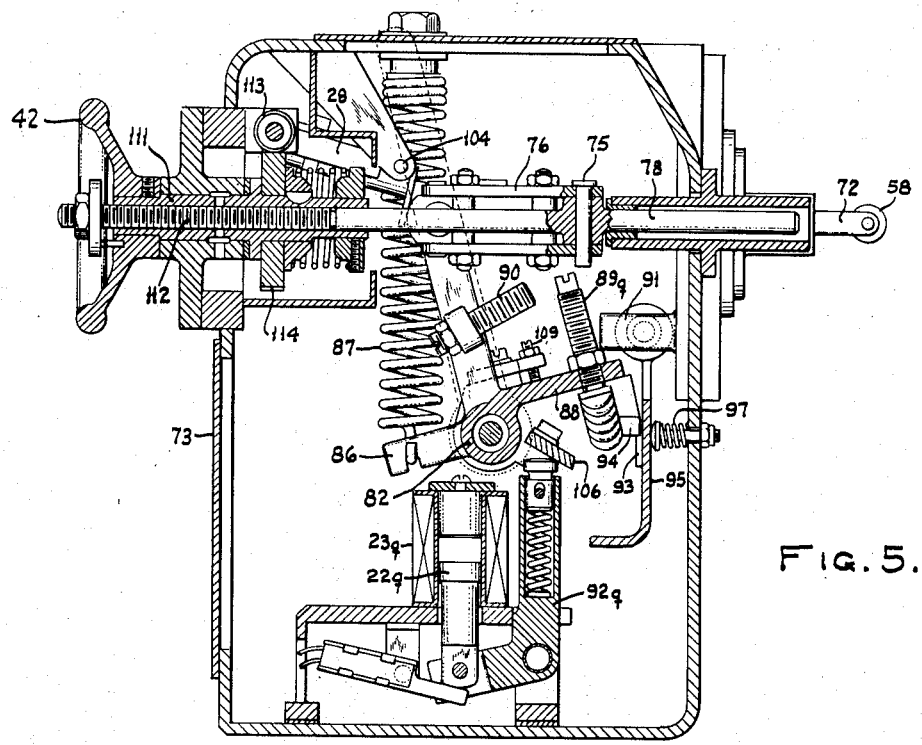
Figs. 5 and 6 are transverse sectional views taken along the lines V—V and VI—VI of Fig. 4.
Figure 6:
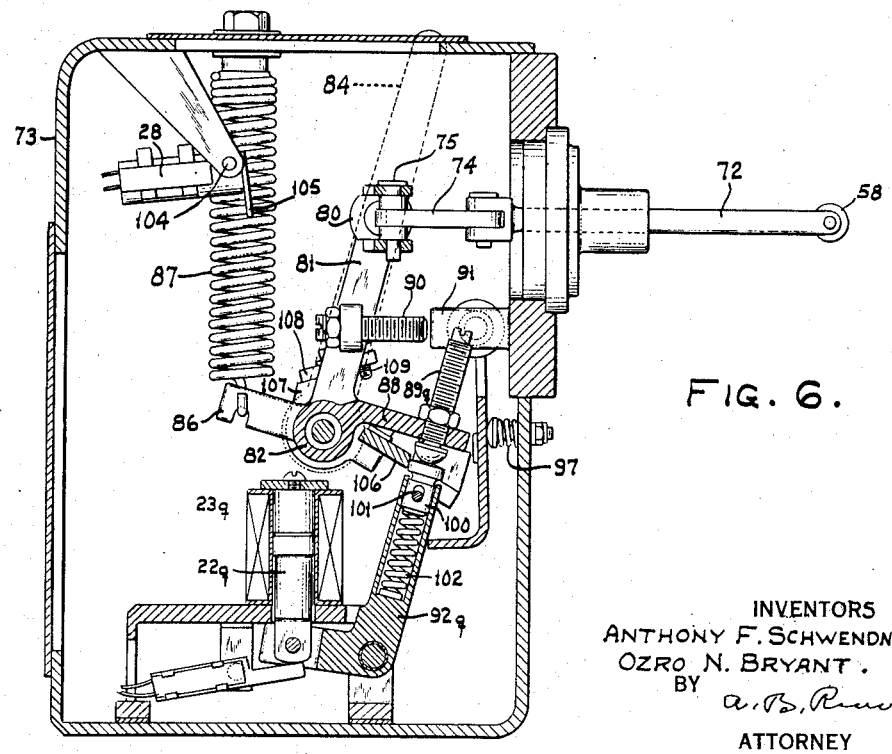

The speed-changing mechanism, at 21, shown in detail at Figs. 3, 4, 5 and 6, includes the pusher 58 for changing the force of the load spring 55, the pusher being carried by the rod 72 extending into the casing 73 and the inner end of the rod being connected, by a link 74, with an intermediate pivot point 75 of the lever 76. One end of the lever is pivotally connected, at 77, with the longitudinally-movable fulcrum rod 78 and the other end of the lever is pivotally connected, at 79, to the abutment member 80 attached to the outer end of the arm 81 carried by the rocker 82 connected to the rock shaft 83 having the handle 84 attached to one end thereof. The rocker has an arm 86 acted on by the spring 87 to bias the rocker 82 in a clockwise direction, as seen in Figs. 5 and 6.

The rocker is provided with a plate 88 and it has tappets 89b, 89c, 89d, 89e, 89f and 89g corresponding to the magnet cores 22b, 22c, 22d, 22e, 22f and 22g. The arm 81 has a screw 90 cooperating with an abutment 91 for limiting the clockwise movement of the rocker.

The magnet cores 22b, 22c, 22d, 22e, 22f and 22g for the respective windings 23b, 23c, 23d, 23e, 23f and 23g are connected to bell crank rockers 92b, 92c, 92d, 92e, 92f and 92g constituting actuating members each of which is moved to actuated position in response to movement of its core brought about by energization of the associated winding.

Initially, the rocker 82 is positioned or set, as shown in Fig. 5, with the spring 87 under tension, positioning being effected by operation of the lever 79, and the rocker is retained in the set position by the latch comprised by the abutment 93 engaging underneath the abutment 94, the latter abutment being formed on the rocker. This is the position of the mechanism, at 21, for operation of the spare turbo-generator at the frequency of the low frequency bus 11a. The abutment 93 is carried by a latch plate 95 which is pivoted at its upper end, at 96, and it is urged toward the rocker by the spring means 97.

With the parts positioned as shown in Fig. 5, if any of the actuating members, for example, the actuating member 92g, is moved to the actuated position shown in Fig. 6, it pushes the latch plate 95 to move the abutment 93 out from underneath the abutment 94, whereupon the spring 87 is effective to move the rocker in a clockwise direction until the tappet 89g abuts with the upper end of the actuating member 92g. Preferably, the actuating members are provided with shock-absorbing abutments 100 telescoping in the outer ends thereof and urged outwardly to the extent of the pin-and-slot connections 101 by means of the springs 102, the impact or shock being reduced because of movement provided by the pin-and-slot connection and compression of the spring. The spring 102 has a force such that it is capable of moving the abutment outwardly to the full extent of the pin-and-slot connection with movement of the rocker counterclockwise to the extent required.

In the initial position of the speed-adjusting apparatus, as shown in Fig. 5, the switch 28 common to the first and second controlling circuits aforesaid is closed, it being tilted for this purpose about the pivot 104 and against gravity due to engagement of the abutment plate 105 with the abutment member 80 attached to the outer end of the rocker arm 81. As the abutment 80 moves in a clockwise direction from the position shown in Fig. 5 to that shown in Fig. 6, the switch 28 moves under the influence of gravity to open the aforesaid controlling circuits.

The mechanism, at 21, includes latch means for holding each of the actuating members 92b, 92c, 92d, 92e, 92f and 92g in actuated position. To this end, there is provided a latch bar 106 carried by brackets 107 journaled on the rocker and having stop arms 108 attached thereto, the stop arms being provided with adjustable screws 109 engageable with the rocker plate 88 as the latter moves in a counterclockwise direction, the latch plate 106 being so initially positioned, as shown in Fig. 5, that any one of the actuating members may move outwardly, the abutment 100 sliding underneath the latch plate and lifting it counterclockwise until it clears the front edge of the bar, whereupon the latter drops behind the abutment, as shown in Fig. 6, to hold the actuating member in actuated position.

Figure 2:
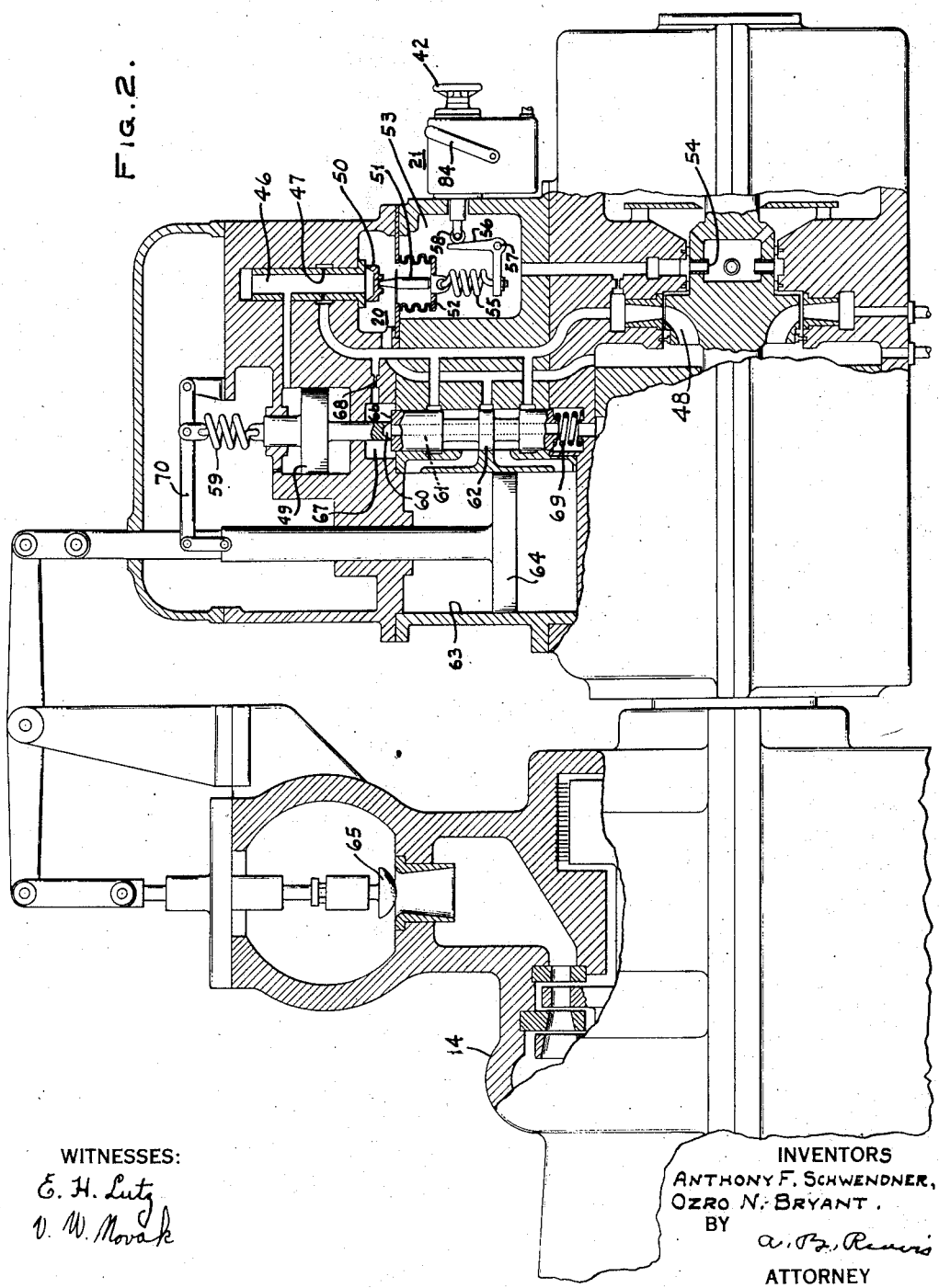
Fig. 2 is a detail, partial sectional view showing the spare turbo-generator together with the governor.
Figure 3:
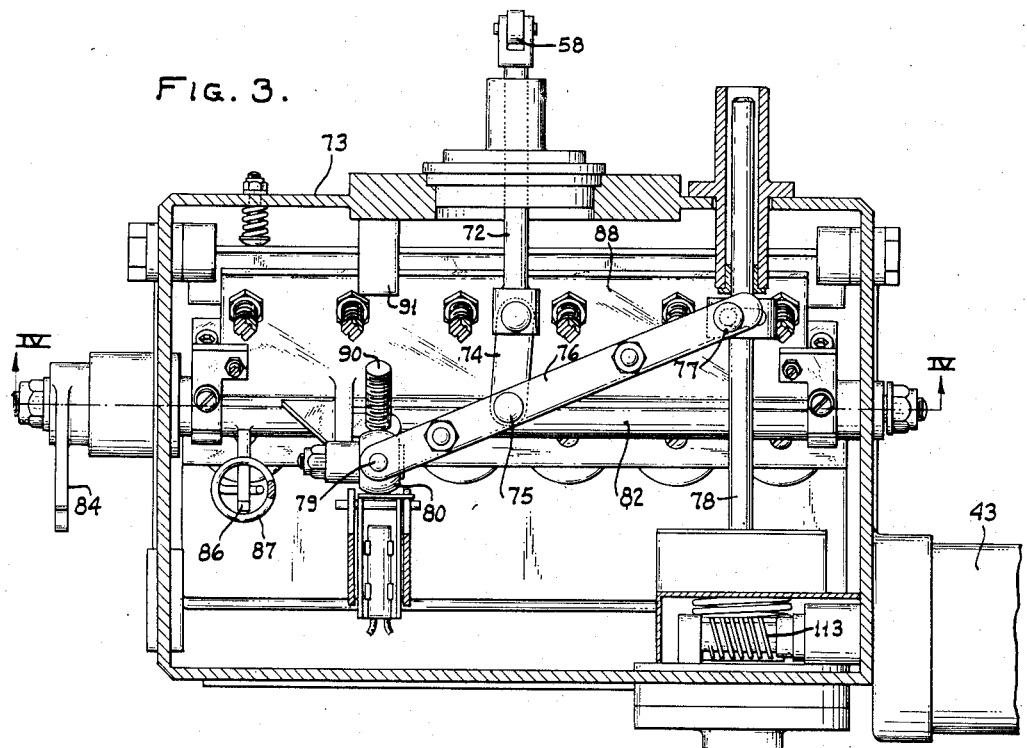
Fig. 3 is a sectional view of the governor adjusting mechanism and taken along the line III—III of Fig. 2.
Figure 4:
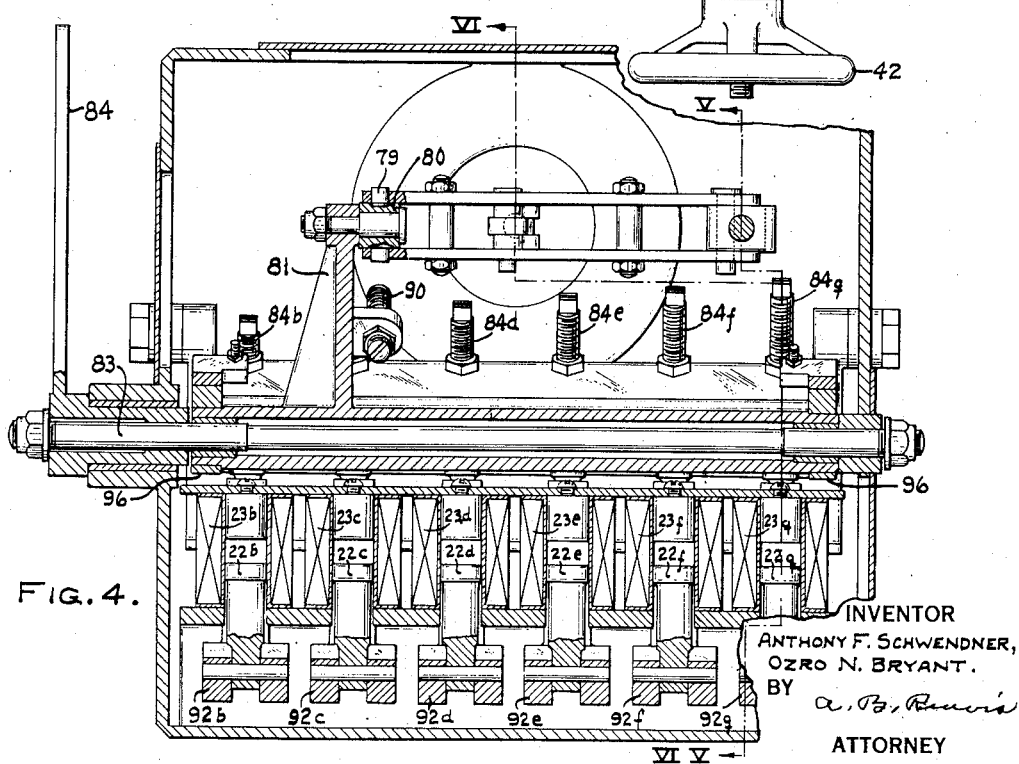
Fig. 4 is a sectional view taken along the line IV—IV of Fig. 3 and viewed in the direction of the arrows.

From Fig. 2, it will be apparent that the more the pusher member 58 is moved in a pushing direction, the greater the spring 55 is proportionally tensioned and the pressure in the space 46 will be proportionately reduced with wider opening of the admission valve to the extent of pressure reduction. Therefore, to increase the speed or load, or both, the spring tension is increased. To provide for progressively increasing governing speeds corresponding to the frequencies of the turbo-generators, at 10b, 10c, 10d, 10e, 10f, and 10g, the required progressive increasing rocker movement is provided by adjustment of the tappets 89b, 89c, 89d, 89e, 89f and 89g.

Speed and load changing adjustment of the apparatus, at 21, is effected by the hand wheel 42 or the motor 43, as hereinbefore pointed out, the hand wheel being axially restrained so that rotational movement of the sleeve 111 attached thereto and having threaded connection with the threaded portion 112 of the fulcrum shaft 78 results in longitudinal movement of the latter and movement of the lever 76 to move the pusher 58 to bring about speed and load adjustment of the governor. Instead of effecting longitudinal movement of the fulcrum shaft by the hand wheel, this movement may be effected by an electric motor 43, the motor driving a worm 113 meshing with a worm wheel 114 connected to the sleeve 111.

With the apparatus set in the position shown in Fig. 5, the pusher 58 is adjusted to govern the spare turbo-generator at a speed corresponding to the frequency of the lowest frequency turbo-generator, at 10a, and further adjustment is made so that the spare turbo-generator carries a small part, for example, 10 per cent of the load of the low frequency bus. While the various tappets 89b, 89c, 89d, 89e, 89f and 89g are adjusted to suit the normal loads and frequencies of the turbo-generators 10b, 10c, 10d, 10e, 10f and 10g, if the actual load and frequency of a bus should deviate from normal, then, pursuant to automatic operation and connection of the spare turbo-generator to the bus, it is necessary to effect further adjustment manually so that the spare turbo-generator may carry the bus load at the normal frequency.

While the invention has been shown in but one form, it will be obvious to those skilled in the art that it is not so limited, but is susceptible of various changes and modifications without departing from the spirit thereof.

What is claimed is:

1. In a power plant system, a plurality of first and second main turbo-generators of differing frequencies, buses for the main turbo-generators, a spare turbo-generator including a turbine, means for connecting the main turbo-generators to their buses and for connecting the spare turbo-generator to the bus of the first main turbo-generator, governing mechanism for the turbine, means pre-set for adjusting the governing mechanism for operation of the spare turbo-generator suitably to the frequencies of the buses to which the second turbo-generators are connected and automatically operative in response to failure of a second main turbo-generator to adjust the governing mechanism for the bus of the latter, and means responsive to operation of the last-named means to disconnect the spare turbo-generator from the bus of the first main turbo-generator and for connecting it to the bus of the failing second main turbo-generator.

2. In a power plant system, a plurality of first and second main turbo-generators of differing frequencies, buses for the main turbo-generators, a spare turbo-generator including a turbine, means for connecting the main turbo-generators to their buses and for connecting the spare turbo-generator to the bus of the first main turbo-generator, governing mechanism for the turbine, means pre-set for adjusting the governing mechanism for operation of the spare turbo-generator suitably to the frequencies of the buses to which the second turbo-generators are connected and automatically operative in response to failure of a second main turbo-generator to adjust the governing mechanism for the bus of the latter, means responsive to operation of the last-named means to disconnect the spare turbo-generator from the bus of the first main turbo-generator and for connecting it to the bus of the failing second main turbo-generator, and means for manually adjusting the governing mechanism to enable the spare turbo-generator to carry the entire load of the bus to which it is normally connected at the normal frequency of the latter and to enable the spare turbo-generator to make up for load deviations from normal of the bus of the failing second turbo-generator so that the spare turbo-generator may carry the actual bus load at the normal bus frequency.

3. The combination as claimed in claim 1 with means responsive to disconnection of the first main turbo-generator from its bus to prevent automatic operation of the pre-set means and with means responsive to automatic operation of the pre-set means to prevent further operation thereof until the connection of the spare turbo-generator with the bus of the first main turbo-generator is restored.

4. In a power plant system, a plurality of main turbo-generators of differing frequencies and including a first turbo-generator and one or more second turbo-generators; separate buses for the first and second turbo-generators; a spare turbo-generator; a first circuit breaker connecting the first turbo-generator to its bus; a second circuit breaker or circuit breakers for connecting the second turbo-generator or turbo-generators to the bus or buses therefor; a third circuit breaker connecting the spare turbo-generator to the bus of the first turbo-generator; normally-open switch or switches between the spare turbo-generator and the second turbo-generator bus or buses and each switch, when closed, connecting the spare turbo-generator to the corresponding bus; said spare turbo-generator including a turbine; a governor responsive to turbine speed to control the admission of motive fluid thereto and including load spring means; apparatus including operated means movable to adjust said spring means, an actuating mechanism corresponding to each second turbo-generator, and means responsive to opening of each second circuit breaker to automatically operate the corresponding actuating mechanism for moving the operated means to adjust the spring means to change the frequency of the spare turbo-generator from that of the first turbo-generator to that of said second turbo-generator whose circuit breaker has opened; and means responsive to movement of an actuating mechanism to actuated position to open the third circuit breaker and to close the switch between the spare turbo-generator and the bus which has been disconnected from its second turbo-generator.

5. In a power plant system, a plurality of main turbo-generators of differing frequencies and including a first turbo-generator and one or more second turbo-generators; separate buses for the first and second turbo-generators; a spare turbo-generator; a first circuit breaker connecting the first turbo-generator to its bus; a second circuit breaker or circuit breakers for connecting the second turbo-generator or turbo-generators to the bus or buses therefor; a third circuit breaker connecting the spare turbo-generator to the bus of the first turbo-generator; normally-open switch or switches between the spare turbo-generator and the second turbo-generator bus or buses and each switch being effective, when closed, to connect the spare turbo-generator to the corresponding bus; said spare turbo-generator including a turbine; a governor responsive to turbine speed to control the admission of motive fluid thereto and including load spring means; apparatus including operated means movable to adjust said spring means, an actuating mechanism corresponding to each second turbo-generator, means responsive to opening of each second circuit breaker to automatically operate the corresponding actuating mechanism for moving the operated means to adjust the spring means to change the frequency of the spare turbo-generator from that of the first turbo-generator to that of said second turbo-generator whose circuit breaker has opened; means responsive to movement of an actuating mechanism to actuated position to open the third circuit breaker and to close the switch between the spare turbo-generator and the bus which has been disconnected from its second turbo-generator; and manually-controllable means operable to adjust the spring means so that the spare turbo-generator may carry the load of the bus to which it is connected at the normal frequency of the latter.

6. The combination as claimed in claim 5 wherein the manually-controllable means forms a component of said apparatus and is operative to move the operated means thereof.

7. In a power plant system, a plurality of main turbo-generators of differing frequencies and including a first turbo-generator of lowest frequency and one or more second turbo-generators each of higher frequency; separate buses for the first and second turbo-generators; a spare turbo-generator; a first circuit breaker connecting the first turbo-generator to its bus; a second circuit breaker or circuit breakers for connecting the second turbo-generator or turbo-generators to the bus or buses therefor; a third circuit breaker connecting the spare turbo-generator to the bus of the first turbo-generator; normally-open switch or switches between the spare turbo-generator and the second turbo-generator bus or buses and each switch being effective, when closed, to connect the spare turbo-generator to the corresponding bus; said spare turbo-generator including a turbine; a governor responsive to turbine speed to control the admission of motive fluid thereto and including load spring means; apparatus including operated means movable to adjust said spring means, an actuating mechanism corresponding to each second turbo-generator, and means responsive to opening of each second circuit breaker to automatically operate the corresponding actuating mechanism for moving the operated means to adjust the spring means to change the frequency of the spare turbo-generator from that of the first turbo-generator to that of said second turbo-generator whose circuit breaker has opened; means responsive to movement of an actuating mechanism to actuated position to prevent operation of a second actuating mechanism until all of said mechanisms are restored to starting position; and means responsive to opening of the first circuit breaker to prevent automatic operation of said apparatus.

8. In a power plant system, a plurality of main turbo-generators of differing frequencies and including a first turbo-generator of lowest frequency and one or more second turbo-generators each of higher frequency; separate buses for the first and second turbo-generators; a spare turbo-generator; a first circuit breaker connecting the first turbo-generator to its bus; a second circuit breaker or circuit breakers for connecting the second turbo-generator or turbo-generators to the bus or buses therefor; a third circuit breaker connecting the spare turbo-generator to the bus of the first turbo-generator; normally-open switch or switches between the spare turbo-generator and the second turbo-generator bus or buses and each switch being effective, when closed, to connect the spare turbo-generator to the corresponding bus; said spare turbo-generator including a turbine; a governor comprising load spring means and an amplifier providing output force dependent upon the resultant of input forces including a force dependent upon turbine speed and force of the spring means; servomotor means responsive to the amplifier output force to control the admission of motive fluid to the turbine; apparatus including operated means movable to adjust said spring means, an actuating mechanism corresponding to each second turbo-generator, and means responsive to opening of each second circuit breaker for automatically operating the corresponding actuating mechanism for moving the operated means to adjust the spring means to change the frequency of the spare turbo-generator from that of the first turbo-generator to that of said second turbo-generator whose circuit breaker has opened; and means responsive to movement of an actuating mechanism to actuated position to open the third circuit breaker and to close the switch between the spare turbo-generator and the bus which has been disconnected from its second turbo-generator.

9. In a power plant system, a plurality of main turbo-generators of differing frequencies and including a first turbo-generator of lowest frequency and a plurality of second turbo-generators each of higher frequency; separate buses for the first and second turbo-generators; a spare turbo-generator; a first circuit breaker connecting the first turbo-generator to its bus; second circuit breakers for connecting the second turbo-generators to their buses; a third circuit breaker connecting the spare turbo-generator to the bus of the first turbo-generator; normally-open switches between the spare turbo-generator and the second turbo-generator buses and each switch being effective, when closed, to connect the spare turbo-generator to the corresponding bus; said spare turbo-generator including a turbine; a governor comprising load spring means and an amplifier providing output force dependent upon the resultant of input forces including a force dependent upon turbine speed and force of the spring means; servo-motor means responsive to the amplifier output force to control the admission of motive fluid to the turbine; first control circuits corresponding to the second turbo-generators and each circuit having normally-open contacts closed by opening of the circuit breaker of the corresponding second turbo-generator; apparatus including operated means movable to adjust said spring means, solenoids energized by said circuits, actuating members movable in response to energization of the respective solenoids to move the operated means to adjust the spring means to change the frequency of the spare turbo-generator from that of the first turbo-generator to that of the second turbo-generator corresponding to the energized solenoid; a normally-closed switch common to said first control circuits and opened in response to movement of one of said actuating members to actuated position; a second control circuit normally closed by said switch for holding said third circuit breaker closed and the latter being arranged to open upon opening of the switch; and means responsive to opening of the third circuit breaker for closing the switch between the spare turbo-generator and the bus which has been disconnected from its second turbo-generator.

10. The combination as claimed in claim 9 wherein the apparatus includes means for mechanically latching each actuating member in actuated position and means for releasing the latching means incident to re-setting the actuating means in starting position and re-connecting the main and spare turbo-generators in normal relation to the buses.

11. The combination as claimed in claim 9 with a second normally-closed switch common to the first control circuits and a third control circuit including a winding for magnetically opening said switch and including said first switch common to the first control circuits and normally-open contacts which are closed by opening of the first circuit breaker.

12. In a power plant system, a plurality of main turbo-generators of differing frequencies and including a first turbo-generator of lowest frequency and a plurality of second turbo-generators each of higher frequency; separate buses for the first and second turbo-generators; a spare turbo-generator; means for connecting the main turbo-generators to their buses and including circuit breakers for connecting the second turbo-generators to their buses and each circuit breaker opening in response to failure of its turbo-generator; a circuit breaker connecting the spare turbo-generator to the bus of the first turbo-generator; normally-open switches between the spare turbo-generator and the second turbo-generator buses and each switch being effective, when closed, to connect the spare turbo-generator to the corresponding bus; said spare turbo-generator including a turbine; a governor comprising load spring means and an amplifier providing output force dependent upon the resultant of input forces including a force dependent upon turbine speed and force of the spring means; servo-motor means responsive to the amplifier output force to control the admission of motive fluid to the turbine; first control circuits corresponding to the second turbo-generators and each circuit having normally-open contacts closed by opening of the circuit breaker of the corresponding second turbo-generator; apparatus including an actuated rod movable longitudinally to vary the force of the spring means, a lever pivotally connected to the actuated rod, a fulcrum for the lever, a rocker for moving the lever about the fulcrum, a spring exerting force on the rocker to move the latter in one direction, means for latching the rocker in starting position and against the force of the spring, solenoids corresponding to the second main turbo-generators and energized by said first control circuits, actuating means corresponding to the respective solenoids and each including a core moved by its solenoid to move the means to actuated position to release the latching means and serve as a limit for angular motion of the rocker under influence of the spring, means for varying the magnitude of motion of the rocker from starting position to the limit fixed by each actuating means in actuated position so that the force of the governor spring means is changed to effect frequency and load change of the spare turbo-generator to the normal frequency and load conditions of the second main turbo-generator corresponding to the actuating means; a normally-closed switch common to said first control circuits and opened in response to movement of each actuating means to actuated position; a second control circuit normally closed by said switch for holding said spare turbo-generator circuit breaker closed and the latter being arranged to open upon opening of the switch; and means responsive to opening of the last-named circuit breaker for closing the switch between the spare turbo-generator and the bus of the second turbo-generator whose circuit breaker has opened.

13. The combination as claimed in claim 12 wherein each actuating means includes an abutment movable to actuated position to serve as a limit for angular movement of the rocker and wherein the means for varying the magnitude of motion of the rocker is comprised by threaded tappets carried by the latter for engagement with the respective abutments in actuated position.

14. The combination as claimed in claim 12 wherein the switch common to the first control circuits is held closed by the rocker when the latter is in starting position and is opened in response to movement of the rocker away from starting position.

15. The combination as claimed in claim 12 with manual means for re-setting the rocker latched in starting position, automatic means for latching each actuating means in actuated position, and means responsive to re-setting movement of the rocker to release the last-named latching means.

16. Apparatus as claimed in claim 12 with manually-operable means for moving the fulcrum.

17. The combination as claimed in claim 12 with a circuit breaker between the first main turbo-generator and its bus and opening in response to failure of such turbo-generator, a second normally-closed switch common to said first control circuits, and a third control circuit including a winding for magnetically opening such switch and including said first switch common to the first control circuits and normally-open contacts which are closed in response to opening of the first main turbo-generator circuit breaker.

ANTHONY F. SCHWENDNER.
OZRO N. BRYANT.

REFERENCES CITED

The following references are of record in the file of this patent:

UNITED STATES PATENTS

| Number | Name | Date |
|---|---|---|
| 1,671,047 | Pfau | May 22, 1928 |
| 1,674,609 | Pfau | June 19, 1928 |
| 2,026,593 | Pearson | Jan. 7, 1936 |
| 2,095,120 | Belfils et al. | Oct. 5, 1937 |
| 2,165,983 | Schmer | July 11, 1939 |
| 2,228,153 | Pfau | June 7, 1941 |
| 2,429,077 | Sheppard | Oct. 14, 1947 |